United States Patent
Sengupta et al.

(10) Patent No.: US 11,886,821 B2
(45) Date of Patent: Jan. 30, 2024

(54) METHOD AND SYSTEM FOR INFERRING ANSWERS FROM KNOWLEDGE GRAPHS

(71) Applicant: Accenture Global Solutions Limited, Dublin (IE)

(72) Inventors: Shubhashis Sengupta, Bangalore (IN); Annervaz K. M., Bangalore (IN); Gupta Aayushee, Bangalore (IN); Sandip Sinha, Bangalore (IN); Shakti Naik, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 343 days.

(21) Appl. No.: 17/232,842

(22) Filed: Apr. 16, 2021

(65) Prior Publication Data

US 2022/0335219 A1 Oct. 20, 2022

(51) Int. Cl.
*G06F 40/295* (2020.01)
*G06F 16/2452* (2019.01)

(52) U.S. Cl.
CPC ...... *G06F 40/295* (2020.01); *G06F 16/24522* (2019.01)

(58) Field of Classification Search
CPC .. G06F 40/30; G06F 40/295; G06F 16/24522; G06F 16/90332; G06F 16/9038; G06F 40/237; G06F 16/2228; G06F 16/2379; G06F 16/243; G06F 16/9535; G06F 18/24; G06F 3/0484; G06F 40/205; G06F 40/279; G06F 40/284; G06F 40/49; G06F 40/56; G06F 16/9024; G10L 13/00; G10L 15/00; G10L 15/1822; G10L 15/22

See application file for complete search history.

(56) References Cited

U.S. PATENT DOCUMENTS

| | | | | |
|---|---|---|---|---|
| 10,691,685 B2* | 6/2020 | Verma | G06F 16/3329 |
| 11,049,500 B2* | 6/2021 | Olabiyi | G10L 13/027 |
| 11,636,869 B2* | 4/2023 | Binder | G06F 3/167 |
| | | | 704/275 |
| 11,645,459 B2* | 5/2023 | Galitsky | G06F 40/51 |
| | | | 704/9 |
| 11,651,158 B2* | 5/2023 | Yang | G06F 40/35 |
| | | | 704/270.1 |
| 11,651,163 B2* | 5/2023 | Olabiyi | G06F 40/284 |
| | | | 704/232 |

(Continued)

OTHER PUBLICATIONS

L Bauer, Y Wang, M Bansal—"Commonsense for Generative Multi-Hop Question Answering Tasks", arXiv preprint arXiv: 1809.06309, 2018—arxiv.org. (Year: 2018).*

(Continued)

*Primary Examiner* — Abdelali Serrou
(74) *Attorney, Agent, or Firm* — Plumsea Law Group, LLC

(57) ABSTRACT

Automated response generation systems and methods are disclosed. The systems can include a deep learning model specially configured to apply inferencing techniques to redesign natural language querying systems for use over knowledge graphs. The disclosed systems and methods provide a model for inferencing referred to as a Hierarchical Recurrent Path Encoder (HRPE). An entity extraction and linking module as well as a data conversion and generation module process the content of a given query. The output is processed by the proposed model to generate inferred answers.

20 Claims, 8 Drawing Sheets

(56) References Cited

U.S. PATENT DOCUMENTS

| | | | |
|---|---|---|---|
| 2019/0220524 A1* | 7/2019 | Costabello | G06F 16/24578 |
| 2019/0370389 A1* | 12/2019 | Blouw | G06F 40/30 |
| 2022/0292262 A1* | 9/2022 | Japa | G06F 16/90332 |
| 2023/0244704 A1* | 8/2023 | Tu | G06F 16/906 704/9 |

OTHER PUBLICATIONS

Bordes, A. et al., (2013). Translating embeddings for modeling multi-relational data. In Advances in neural information processing systems (pp. 2787-2795).

Kiong, W. et al., (2017). DeepPath: A reinforcement learning method for knowledge graph reasoning. arXiv preprint arXiv:1707. 06690.

Das, R. et al., (2017). Go for a Walk and Arrive at the Answer: Reasoning Over Paths in Knowledge Bases with Reinforcement Learning. In NIPS-17 Workshop on Automatic Knowledge-Base.

Chen, W., Xiong, W., Yan, X., & Wang, W. (2018). Variational Knowledge Graph Reasoning. arXiv preprint arXiv:1803.06581.

"SEMPRE: Semantic Parsing with Execution"; The Stanford Natural Language Processing Group; https://nlp.stanford.edu/software/sempre/.

Angeli, G., Premkumar, M. J. J., & Manning, C. D. (2015). Leveraging linguistic structure for open domain information extraction. In Proceedings of the 53rd Annual Meeting of the Association for Computational Linguistics and the 7th International Joint Conference on Natural Language Processing (vol. 1: Long Papers) (vol. 1, pp. 344-354).

Lample, G., Ballesteros, M., Subramanian, S., Kawakami, K., & Dyer, C. (2016). Neural architectures for named entity recognition. arXiv preprint arXiv:1603.01360.

Devlin, J., Chang, M. W., Lee, K., & Toutanova, K. (2018). Bert: Pre-training of deep bidirectional transformers for language understanding. arXiv preprint arXiv:1810.04805.

Bowman, S. R., Angeli, G., Potts, C., & Manning, C. D. (2015). A large annotated corpus for learning natural language inference. arXiv preprint arXiv:1508.05326.

Chen, Q., Zhu, X., Ling, Z., Wei, S., Jiang, H., & Inkpen, D. (2016). Enhanced LSTM for natural language inference. arXiv preprint arXiv:1609.06038.

Sordoni, Alessandro, et al. "A hierarchical recurrent encoder-decoder for generative context-aware query suggestion." Proceedings of the 24th ACM International on Conference on Information and Knowledge Management. ACM, 2015.

Y. Zhang, H. Dai, Z. Kozareva, A. Smola, and L. Song. Variational reasoning for question answering with knowledge graph. AAAI, 2018.

Lan, W., & Xu, W. (2018). Neural Network Models for Paraphrase Identification, Semantic Textual Similarity, Natural Language Inference, and Question Answering. arXiv preprint arXiv:1806.04330.

Zhou, Mantong, Minlie Huang, and Xiaoyan Zhu. "An interpretable reasoning network for multi-relation question answering." arXiv preprint arXiv:1801.04726 (2018).

\* cited by examiner

METHOD AND SYSTEM FOR INFERRING ANSWERS FROM KNOWLEDGE GRAPHS

TECHNICAL FIELD

The present disclosure generally relates to the use of inference in automated response generation systems. More specifically, the present disclosure generally relates to a system and method for providing inferred responses to user inputs with reference to a knowledge graph by applying trained deep learning models.

BACKGROUND

Reasoning and inference are central to both human and artificial intelligence. Natural language inference (NLI), also known as recognizing textual entailment (RTE), involves determining an inferential relationship (e.g., entailment, contradiction, or neutral) between a premise p and a hypothesis h. Natural language querying over knowledge graphs is essential for the human consumption of this information. To achieve this type of query, the natural language query is typically converted to a structured query and submitted to the knowledge graph. However, among other issues, such an approach requires specific training data pertaining to the domain of the knowledge graph. Thus, modeling inference in human language in order to automatically generate accurate responses to queries has continued to represent a challenging problem in artificial intelligence.

There is a need in the art for a system and method that addresses the shortcomings discussed above.

SUMMARY

In the context of this disclosure, an automated response generation system can include a deep learning model specially configured to apply inferencing techniques to solve the challenge of natural language querying over knowledge graphs. The disclosed systems and methods provide a model for inferencing referred to as a Hierarchical Recurrent Path Encoder (HRPE). The disclosed system and method provide several advantages over existing systems and methods. For example, embodiments of the inferencing model can be fine-tuned for broader use across domains with less training data than conventional models. The HRPE approach also eliminates the need for large domain specific training data for querying on new knowledge graphs from different domains, thereby significantly reducing computational load and increasing processing speed.

In one aspect, the disclosure provides a computer implemented method of generating responses to queries. The method includes a first step of receiving a natural language query and a second step of generating a hypothesis based on the received query. A third step includes encoding a first path in a knowledge graph to generate a first encoding, the first path connecting to a first possible answer to the query, and a fourth step includes collectively encoding a first plurality of paths in the knowledge graph to generate a second encoding, the first plurality of paths including the first path. The method also includes a fifth step of generating attention weights for each of the first encoding and the second encoding to produce weighted encodings, and a sixth step of selecting an encoding from the weighted encodings based on which encoding is associated with a greater attention weight, the selected encoding corresponding to a first vector. The method further includes a seventh step of classifying the first vector, the classification indicating whether the selected encoding entails or contradicts the hypothesis.

In yet another aspect, the disclosure provides a non-transitory computer readable medium storing software that may comprise instructions executable by one or more computers which, upon execution, cause the one or more computers to: (1) receive a natural language query; (2) generate a hypothesis based on the received query; (3) encode a first path in a knowledge graph to generate a first encoding, where the first path connects to a first possible answer to the query; (4) collectively encode a first plurality of paths in the knowledge graph to generate a second encoding, where the first plurality of paths includes the first path; (5) generate attention weights for each of the first encoding and the second encoding to produce weighted encodings; (6) select an encoding from the weighted encodings based on which encoding is associated with a greater attention weight, the selected encoding corresponding to a first vector; and (7) classify the first vector, the classification indicating whether the selected encoding entails or contradicts the hypothesis.

In yet another aspect, the disclosure provides a system for generating a response to a query, the system comprising one or more computers and one or more storage devices storing instructions that may be operable, when executed by the one or more computers, to cause the one or more computers to: (1) receive a natural language query; (2) generate a hypothesis based on the received query; (3) encode a first path in a knowledge graph to generate a first encoding, where the first path connects to a first possible answer to the query; (4) collectively encode a first plurality of paths in the knowledge graph to generate a second encoding, where the first plurality of paths includes the first path; (5) generate attention weights for each of the first encoding and the second encoding to produce weighted encodings; (6) select an encoding from the weighted encodings based on which encoding is associated with a greater attention weight, the selected encoding corresponding to a first vector; and (7) classify the first vector, the classification indicating whether the selected encoding entails or contradicts the hypothesis.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
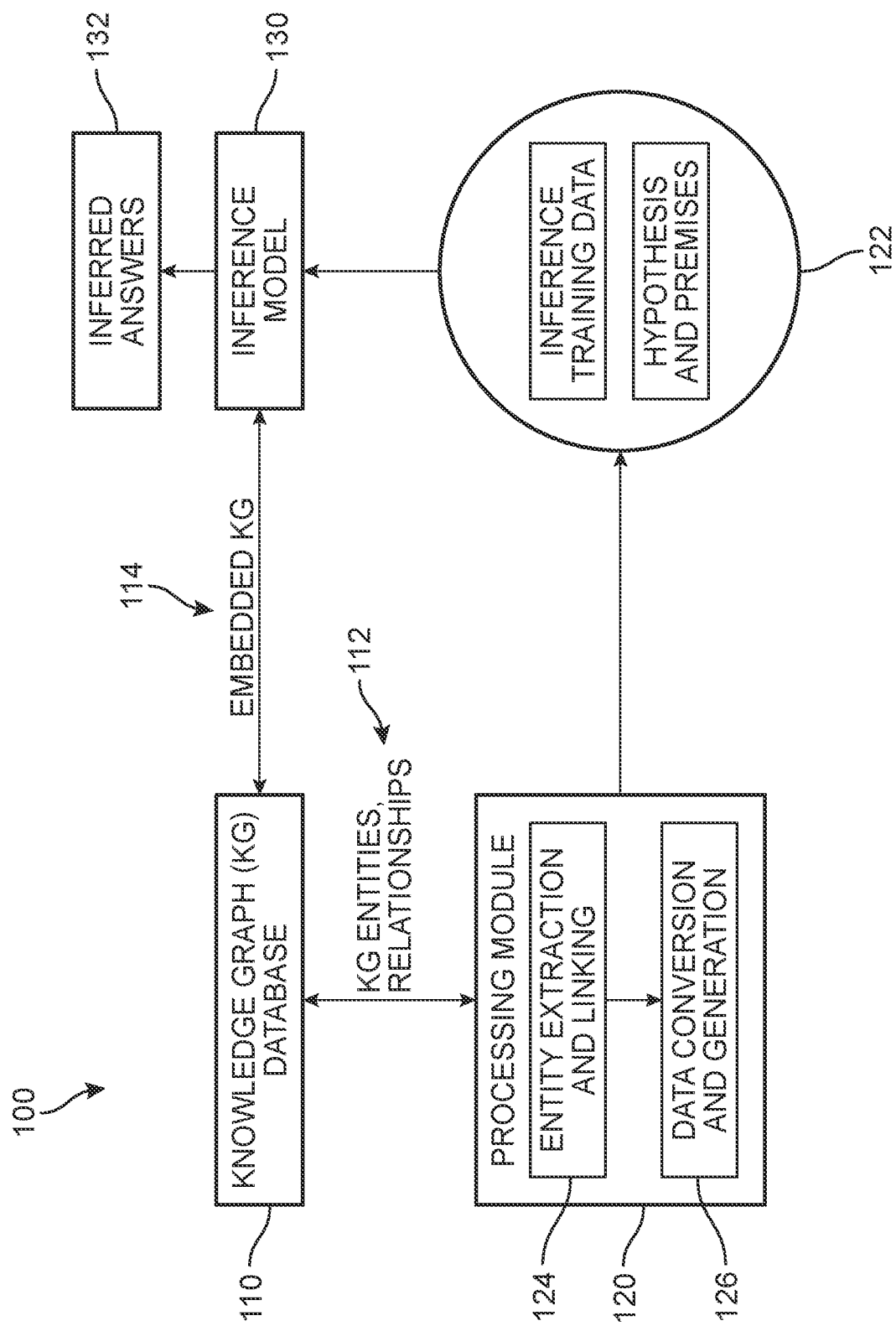
FIG. 1 is a schematic diagram of an overview of a framework for a natural language-based inference system, according to an embodiment.

Conversation systems such as those providing virtual chatbots or intelligent query-and-answer models are relied upon more and more by users in their day-to-day lives, as well as by businesses, researchers, and other organizations to retrieve information. Knowledge graphs are used to store information about a wide variety of subjects. Extraction of answers from a given knowledge graph using available question-and-answer (QA) systems traditionally requires a translation of the natural language questions into a formal representation of a query. However, knowledge graphs are typically very complex and determining all possible answer combinations is a prohibitive process. Thus, the classification accuracy of these systems has remained a problem.

The following disclosure approaches the process of natural language querying over knowledge graphs from the perspective of inference in order to more effectively and accurately mine the information stored in knowledge graphs. Natural language querying over such Knowledge Graphs (KGs) is essential for the human consumption of the information available in them. This type of query has conventionally been performed by converting the natural language query to a structured query and then firing the structured query on the KG. However, direct question and answer models over KG are scarce. Furthermore, these models require specific training data pertaining to the domain of the KG and do not provide inferencing capability for answering complex queries. As will be discussed in detail below, the proposed embodiments describe a new framework for reframing QA systems over knowledge graphs to apply an inference-based approach that include premise-hypothesis pairs. In one example, trained deep learning models are used to perform proxy inferencing. The proposed inferencing models can be fine-tuned to be used across domains with less training data that is required by conventional models.

As a general matter, a knowledge graph ("KG") can refer to a representation that captures the salient knowledge about a particular task. A knowledge graph is a structured representation of facts, consisting of entities, relationships and semantic descriptions. Entities can be real-world objects and abstract concepts, relationships represent the relation between entities, and semantic descriptions of entities and their relationships contain types and properties with a well-defined meaning. The knowledge graph includes an array of interconnected nodes and each connection represents a relationship with its own properties or attributes.

As will be discussed below, in some embodiments, a portion of the knowledge graph that includes group of nodes can be isolated or extracted, where each node represents various properties, objects, subjects, and constraints, in order to respond to a specific query. In many cases, knowledge graphs can store and convey in a single network a large collection of information. As some examples, a knowledge graph encodes the domain entities, relationships, processes, and polices for a given business or organization. A generic semantic natural language processing engine can then be applied to user queries and retrieve the correct results from the knowledge graph. In addition, the nodes will be connected to other nodes by an "edge" line, also referred to herein as a transitional path or transitional edge. For example, a first node will be connected to a second node by a transitional path. Thus, a knowledge graph may provide an organized graph that ties nodes and edges, where a node may be related to semantic concepts, such as persons, objects, entities, events, etc., and an edge may be defined by relations between nodes based on semantics. It should be appreciated that, as described herein, the term "node" may be used interchangeably with "entity," and "edge" with "relation." Furthermore, classifications may provide assignment of instances to pre-defined classes to decide whether there are matches or correlations.

For purposes of introduction, FIG. 1 presents a schematic overview of an embodiment of the proposed system framework 100. As illustrated in framework 100, natural language querying over KGs is approached from the perspective of inference. As a KG contains a set of facts that can support a given answer, these facts can be expressed as a premise that can signal whether an answer is right or wrong. In general, a Natural Language Inference (NLI) approach is used to identify whether a statement (hypothesis: H) in natural language can be supported or contradicted in the context of another statement (premise: P) in natural language. If the hypothesis can be neither inferred nor contradicted, the hypothesis is deemed 'neutral' to the premise. When a query is submitted by a user and received by a question-and-answer model, it will typically be inputted in natural language (NL) format. In different embodiments, given a user query, the generated hypothesis will be based on potential answers to the query, while a corresponding set of premises for each is populated based on the facts related to them in the KG.

In different embodiments, the framework 100 includes a knowledge graph or other information database ("KG database") 110, a natural language processing module 120, and an inference model module 130. In some embodiments, the proposed system is configured convert a question-and-answer on KG to that of NLI. As a general matter, natural language inference is approached as a classification problem. For example, given two sentences—hypothesis and premise—the problem lies in classifying the relationship between them into one of three classes: 'entailment', 'contradiction', or 'neutral'. As will be discussed below, a customized model, herein referred to as a Hierarchical Recurrent Path Encoder (HRPE) model, will be applied to solve the inference problem. It should be appreciated that the proposed approach is amenable to domain adaptation, and this property can be utilized for KGs from new domains with fewer training data and/or experimental testing.

As shown in FIG. 1, when a query is received by the processing module 120, a series of steps involving both an entity extraction and linking stage 124 and a data conversion and generation stage 126 will occur. These steps will be discussed in further detail with reference to FIG. 2. The processing module 120 accesses data related to relevant entities and relationships 112 from the KG database 110 in order to perform its tasks. In different embodiments, the processing module 120 can produce output 122 that can include inference training data and/or actual hypothesis and premises data. The output 122 is shared with the inference model module 130, which also receives embedded KG data 114 that are learned from the graph data and help in predicting unknown links and extracting relations from the graph, as well as in capturing paraphrases, hierarchy, logical patterns and similarity in the KG. Such embeddings can be generated by various toolkits such as but not limited to OpenKE. The inference model module 130 then generates inferred answers 132.

Thus, the proposed solution framework includes several components that enable interaction with KGs, as well as extraction and linking of entities in queries with KGs. The components are also configured to convert queries to a multiple-choice query-answer format followed by conversion to premise-hypothesis label format, and finally to train the inference models on this data to predict query answers.

Figure 2:
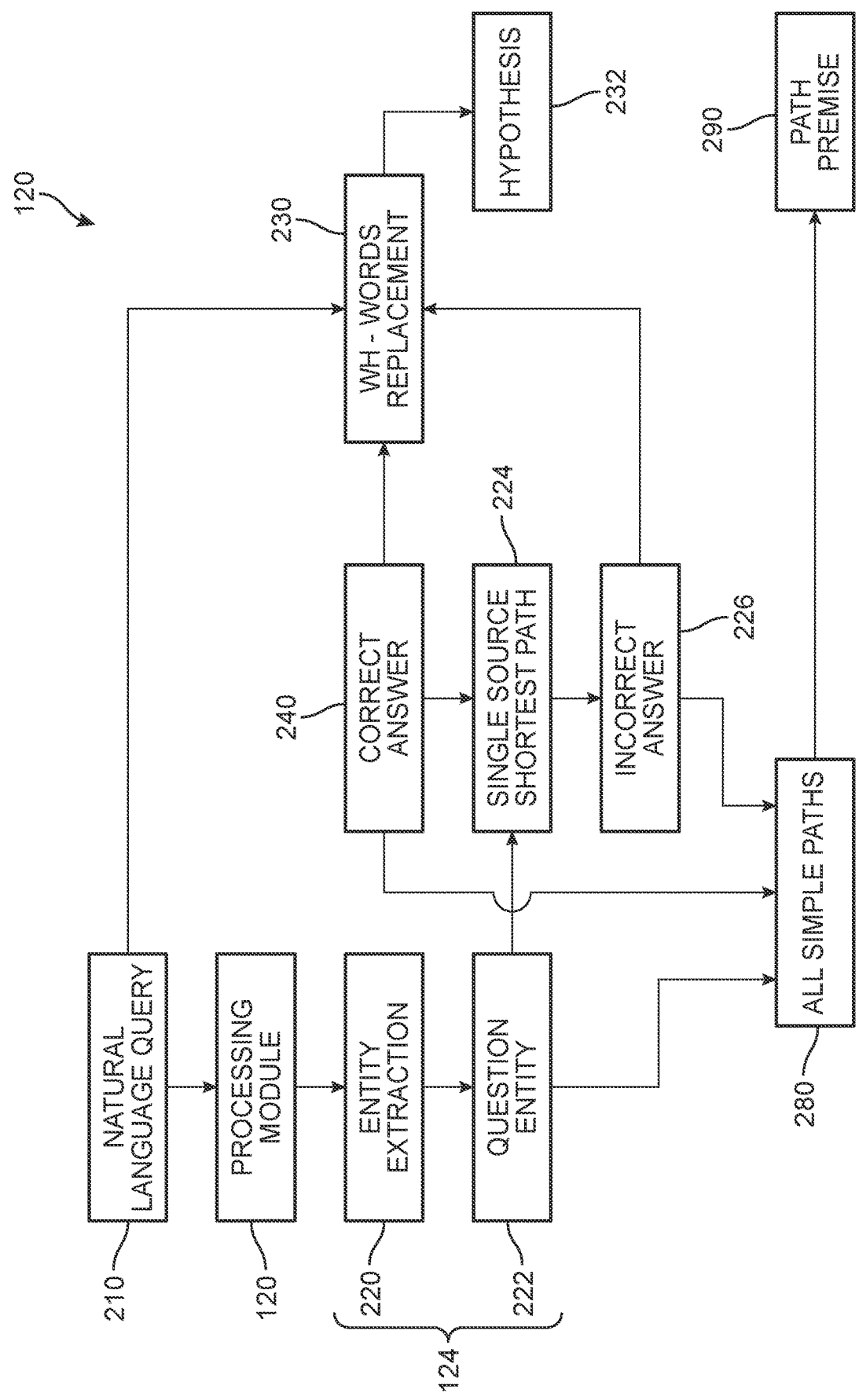
FIG. 2 is a diagram of an example processing module for the framework of FIG. 1, according to an embodiment.

Referring now to FIG. 2, further details regarding the processing module 120 are presented. In a first step 210, a natural language query is received by the processing module 120. During the entity extraction and linking stage 124 an entity extraction and linking submodule automatically identifies and extracts entities and relations between entities within the text of each of the multiple nodes of the KG in a second step 220. As some examples, the submodule may apply one or more Named Entity Recognition (NER) and Relationship Extraction processes for information extraction, such as but not limited to linguistic grammar-based techniques and statistical models, ontology knowledge models, OpenIE, Bi-LSTM CRF, BERT, etc. To identify and extract entities the entity extraction and linking submodule may apply natural language processing techniques. The entity extraction and linking submodule may then apply reasoning techniques over multiple knowledge sources to infer question-answer links. In some embodiments, the entity extraction and linking submodule may further score and rank the extracted entities and links to generate a most-representative set of entities and links. In one embodiment, the entity extraction and linking submodule may include a recognition engine component that applies natural language processing techniques or other entity extraction techniques to extract relevant entities and supporting entities from the KG. In some cases, the entity extraction and linking submodule may receive a list of extracted entities from the recognition engine component and filter the list of extracted entities by removing irrelevant entities, e.g., lexical terms, short terms, context terms, or entities mentioned in reference. In some cases, the entity extraction and linking submodule may further categorize or label extracted entities in the list of extracted entities. In some cases, technical definitions may be applied that restrict the set of valid paths between such nodes, including simple paths that do not visit the same node twice. In a third step 222 a question entity may be identified and provided to a path generation submodule that identifies all of the available simple paths ("all simple paths") 280. In other words, the path generation submodule 280 collects potential answers to the query, and these potential answers will be used to generate the path premise 290.

More specifically, with a given KG ("K") and a natural language query ("Q") including the entities extracted by the entity extraction and linking submodule, $Q_e = \{e_1, \ldots, e_n\}$, the challenge can be understood to involve retrieving a correct set of one or more answers 240 from nodes of K. The correct answers are based on pre-classified datasets, such as but not limited to the SNLI (Stanford Natural Language Inference) dataset, the PathQuestions (PQ) dataset, or the MultiNLI (Multi-Genre Natural Language Inference) corpus. Such datasets provide pairs (premise and hypothesis) with binary labels denoting whether the relationship between each pair entails or is neutral. The hypothesis is created using the question and correct answer from the options, and the premise is retrieved from the training corpus. In this case, a potential answer set $A_p$ is populated from the connected entities of $Q_e$ in K. For each a E $A_p$, the various paths in K from a to each element of $Q_e$ is populated and included as part of the premise P.

In addition, in a fourth step 230 involving a data conversion and generation submodule, for the set $a_t \in A_p$, all of the "Wh"-words—also referred to as interrogatives—in the query are replaced with a to form hypothesis $H_i$ 232. In other words, by removing the "wh-" type words such as "who", "where", "why", "what", "which", "when", "how", etc., the query can be converted into a statement that connects the answer with the query. Incorrect answer(s) 226 can also be identified in a fifth step 224 by determining the shortest path between the query-entities. For example, in some embodiments, the data is converted to Multiple Choice Query Answer (MCQA) pairs, where correct answers are obtained from the question-and-answer data and incorrect answers from negative sampling of entities n-hop away from question entities in the Knowledge Graph. In one embodiment, the Single Source Shortest Path of length n [Q $A_1|A_2|A_3|A_4$]. In addition, Premise-Hypothesis-Label triples are created from the MCQA. A hypothesis can be generated by the replacement of the "wh"-words in the query and the premise represents a concatenation of all simple paths between entities in question and entities in answers [Q $A_i$ H $p_1$ and $p_2$ and . . . and $p_n$ L]. Finally, a Query-Hypothesis-Path is created from the MCQA pairs as [Q $A_i$ H $p_1$. $p_2$ . . . $p_n$ L].

As a general matter, given two sentences (i.e., the premise P and the hypothesis H), the NLI task is to determine whether (1) h is entailed by p; (2) the sentences contradict one other; or (3) there is no inferential relationship between the sentences (neutral). In different embodiments, the premise hypothesis pair (P; H), is processed using inferencing models to check for entailment and contradiction. Entailment implies that the answer $a_i$ is in the correct answer set $A_c$, and discards the remaining answers. The set $A_c$ can then be provided as the result for the original natural language query.

A path between two entities $e_i$ and $e_j$ in K is a ordered set of triples Pij. If they are directly connected, the $P_{ij}$ contains only a single triple, $\{(e_i, r_{ij}, e_j)\}$, where $r_{ij}$ rij stands for the relationship between $e_i$ and $e_j$. If the length of the path connecting them is n, then $P_{ij}$ will contain n such triples. There can be multiple paths between two entities in K, and all paths upper bounded by a hyper parameter for length are considered in the premise path set, P. Each fact (a single triplet in single path) in the premise is converted to natural language form using templates. For example (Joe Biden, presidentOf, USA) is converted to Joe Biden is the president of the USA. This type of templates can be written for relationship types in K. Using this method, the premise is a set of sentences and hypothesis is a single sentence. As will be discussed below, after forming the set of paths that form the premise, the proposed HRPE model can be used to generate the inferred answers.

Figure 3:
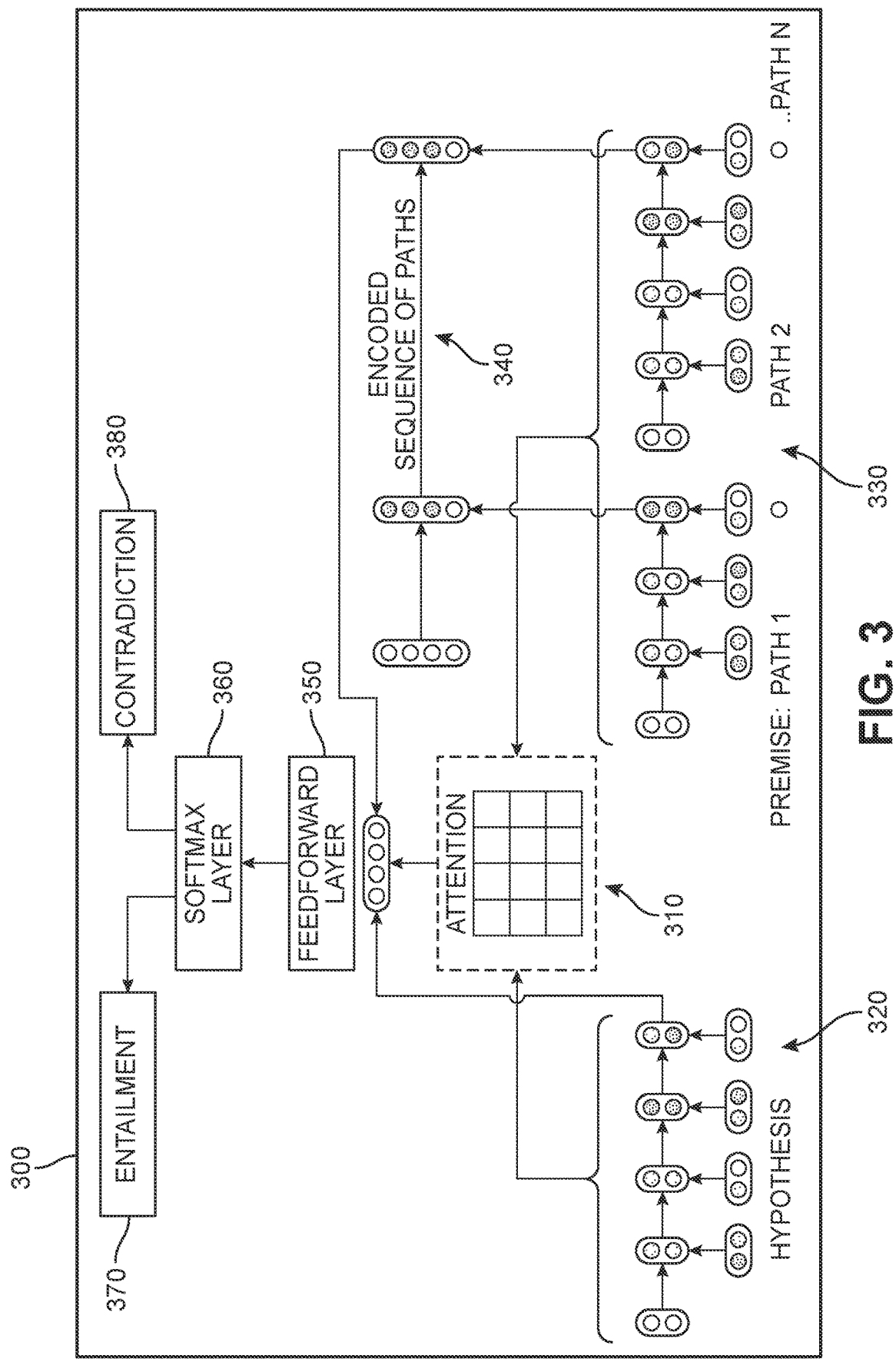
FIG. 3 is a schematic diagram representing an architecture for a Hierarchical Recurrent Path Encoder Model (HRPE) model, according to an embodiment.

Referring to FIG. 3, details regarding the HRPE are provided. As a general matter, the HRPE is a path encoder model that is related to the hierarchical recurrent encoder-decoder model (HRED) that handles sequence of queries and generates context-aware suggestions for users. HRED is also an extension of a recurrent neural network (RNN) language model. HRED generally extends encoder-decoder architecture to the natural dialogue setting. The HRED assumes that each output sequence can be modelled in a two-level hierarchy: sequences of sub-sequences, and sub-sequences of tokens. For example, a dialogue may be modelled as a sequence of utterances (sub-sequences), with each utterance modelled as a sequence of words. Similarly, a natural-language document may be modelled as a sequence of sentences (sub-sequences), with each sentence modelled as a sequence of words. The HRED model consists of three RNN modules: an encoder RNN, a context RNN and a decoder RNN. Each sub-sequence of tokens is deterministically encoded into a real-valued vector by the encoder RNN. This is given as input to the context RNN, which updates its internal hidden state to reflect all information up to that point in time. The context RNN deterministically outputs a real-valued vector, which the decoder RNN conditions on to generate the next sub-sequence of tokens.

The HRPE model extends the HRED model even further to address deficiencies of the HRED and other models. Based on the HRPE method, for every possible answer for a query, all paths leading to it over the KG are encoded. In addition, each path leading to an answer is encoded separately on a sentence level and all paths together are also encoded on a document level. Hypothesis encoding (H) is then used to generate attention over each path encoding, and create a single path encoding based on the attention weights (p). The path encodings are also further encoded by another LSTM (P), in hierarchical fashion. The concatenated vector H:p:P is then fed through a Feed Forward network in order to classify the encoded path by determining whether the encoded path follows the hypothesis or not.

FIG. 3 illustrates a proposed HRPE architecture ("HRPE") 300, according to some embodiments. As illustrated in FIG. 3, the HRPE 300 may include an attention component 310, hypothesis information 320, and premise information 330. As illustrated, the attention component 310 may receive hypothesis information 320 and premise information 330. In addition, the path information 330 is converted to an encoded sequence of paths 340 that is shared with a feedforward layer 350. The hypothesis information 320 and output of the attention component 310 are also provided to the feedforward layer 350. The results of the feedforward layer 350 are processed by a softmax layer 360, which generates a classification (entailment 370, contradiction 380).

More specifically, as a first step, each path $P_j \in P$ is encoded using an LSTM (long short term memory) network, as per Equation (1):

$$\forall Pj \in P, pj=(pj1, \ldots ,pjn) \leftarrow \text{LSTM}(Pj)$$

The hypothesis $H_i$ is then encoded to H using a bi-LSTM, per Equation (2):

$$H=(h_{i1}, \ldots ,h_{in}) \leftarrow \text{bi-LSTM}(H_i)$$

in a second step. This is used to generate attention over each path encoding, and to create a single path encoding (p) based on the attention weights, per Equation (3):

$$p = \sum_j \frac{H.(pj)^T}{\sum_k H.(pk)^T}(pj1, \ldots , pjn)$$

The three steps above allow the proposed model to address the premise component from the hypothesis perspective. The path encodings were also further encoded by another LSTM network, in hierarchical fashion, to generate P, per Equation (4):

$$P=(P_1, \ldots ,P_n) \leftarrow \text{LSTM}(p_1, \ldots ,p_j)$$

Equation (4) is required to enable interaction(s) between paths for the final inference. In addition, the concatenated vector H:p:P is fed through a Feed Forward network to do the classification prediction, per Equation (5):

$$\text{label}=\text{softmax}(W^T A))$$

and Equation (6):

$$\text{loss}=C(\text{label}_{gold},\text{label})$$

where W is the model parameter and C(p; q) denotes the cross-entropy between p and q. The loss is minimized by averaging the loss across the training samples in order to learn the various model parameters using stochastic gradient descent.

Furthermore, in embodiments of the proposed approach, two types of tokens are provided as input to the model: entity-relationship tokens and template/question words tokens. In one embodiment, TransE, a method which models relationships as translations operating on the low-dimensional embeddings of the entities, is used to generate KG embeddings for entities and relationship tokens. In some embodiments, pre-trained Glove 300D embeddings are used for the remaining vocabulary words. Generally, the template/question word tokens are very few in number compared to entity relationship tokens. It is important to note that the KG embeddings can be generated in an unsupervised fashion given a new KG. In other words, the concept of inferencing has less influence or effect on the domain, resulting in learnings that are transferable across domains. Thus, the HRPE model offers domain adaptability, and can be used to create Q-and-A models for domains where a KG is available, but with limited Q-and-A training data. As such, the model(s) trained on one source domain Q-and-A training data $D_s$ can be used with minimal fine-tuning on a new target domain $D_t$. A transformation of the KG embeddings between source and target domain can also be learned in an unsupervised manner and can be fine-tuned with less training data from the target domain, increasing domain adaptability of the model(s). This can be performed per Equation (7):

$$f(W,E(K_s))=E(K_t)$$

where W are the model parameters for the transformation function $f$ (learned unsupervised and then fine-tuned), E is the KG embeddings generation function and $K_s$, $K_t$ are the source and target domains KGs respectively and Equation (8):

$$I_s \leftarrow \text{Train}(D_s, E(K_s))$$

where $I_s$ is a trained inference model from the source domain.

For creating the model on the target domain $I_t$, the trained model from the source domain, learned transformation function for KG embeddings and fine tuning training data from target domain are utilized, per Equation (9):

$$I_t \leftarrow \text{Train}(D_t, f(W, E(K_s))): I_s.$$

Using the disclosed methods, state-of-the-art accuracy has been obtained on both two and three path length Q-and-A during testing of an embodiment of the HRPE model on available datasets. For example, the anchored WikiMovies knowledge graph contains over 1 million triples having 38340 entities and 6 relationship types covering directors, writers, actors, languages, release years, and languages associated with movies. Thus, for each query, a total of n multiple answer choices were populated including the set of correct and incorrect answers. The premise-hypothesis pairs were labelled: entailment for the correct answers and contradiction for the wrong answers, generating PHL triplet (Premise-Hypothesis-Label) triplet data. The triplet data was then further split to test and train the models. The classification accuracy was calculated based on the predicted class and the gold label for each PHL sample. For QA accuracy, the set of predicted answers were populated based on the inference prediction with the hypothesis created from potential answer set. The aggregated correct answers for each question were matched with the gold labeled answers for each query and if both the sets matched, the question is considered to have been answered correctly. If there is no match, the answer is deemed incorrect.

As shown in Table 1 below, during testing, an embodiment of the HRPE model was found to exceed the baseline variational model (VRN) published for the MoviE Text Audio QA (MetaQA) Dataset, which contains more than 400K questions for both single and multi-hop reasoning.

metric used for external models, while an Exact Answer Set Match metric was used for the HRPE QA accuracy calculation.

Domain adaptability data is presented in Table 2 below, generated by pre-training the HRPE model with the MetaQA dataset (source domain, $D_s$) and fine-tune the model on the PQ dataset (target domain, $D_t$). The results support the domain adaptability of the proposed approach.

TABLE 2

| Path Length | Model | Without Domain Adaptation | | With Domain Adaptation | |
|---|---|---|---|---|---|
| | | Classification Accuracy | QA Accuracy | Classification Accuracy | QA Accuracy |
| Two-Length | HRPE | 77.75 | 56.64 | 78.29 | 56.02 |
| Three-Length | HRPE | 94.18 | 88.96 | 94.33 | 88.66 |

Figure 4A:
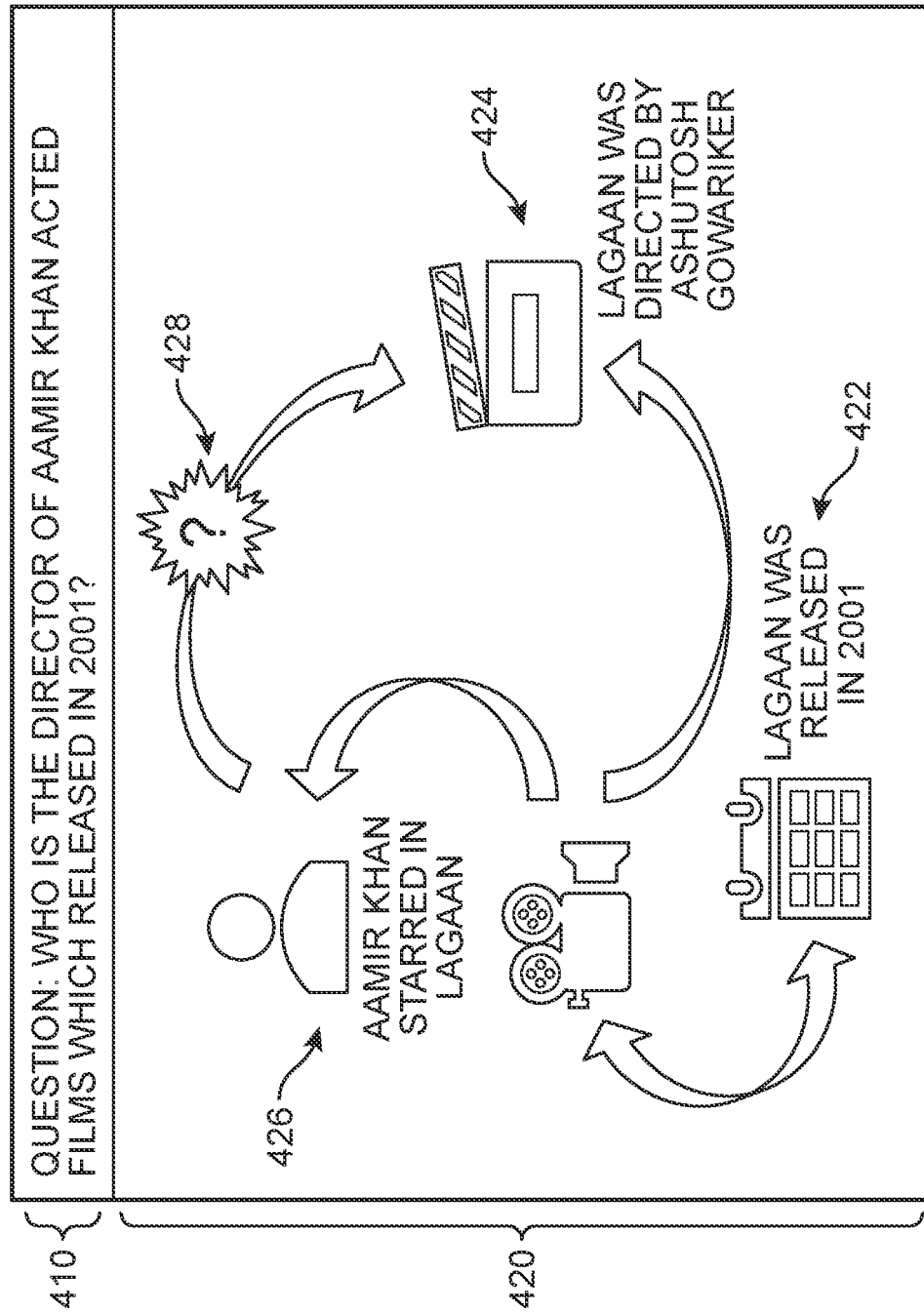
FIGS. 4A and 4B depict an example of an implementation of the framework of FIG. 1, according to an embodiment.
Figure 4B:
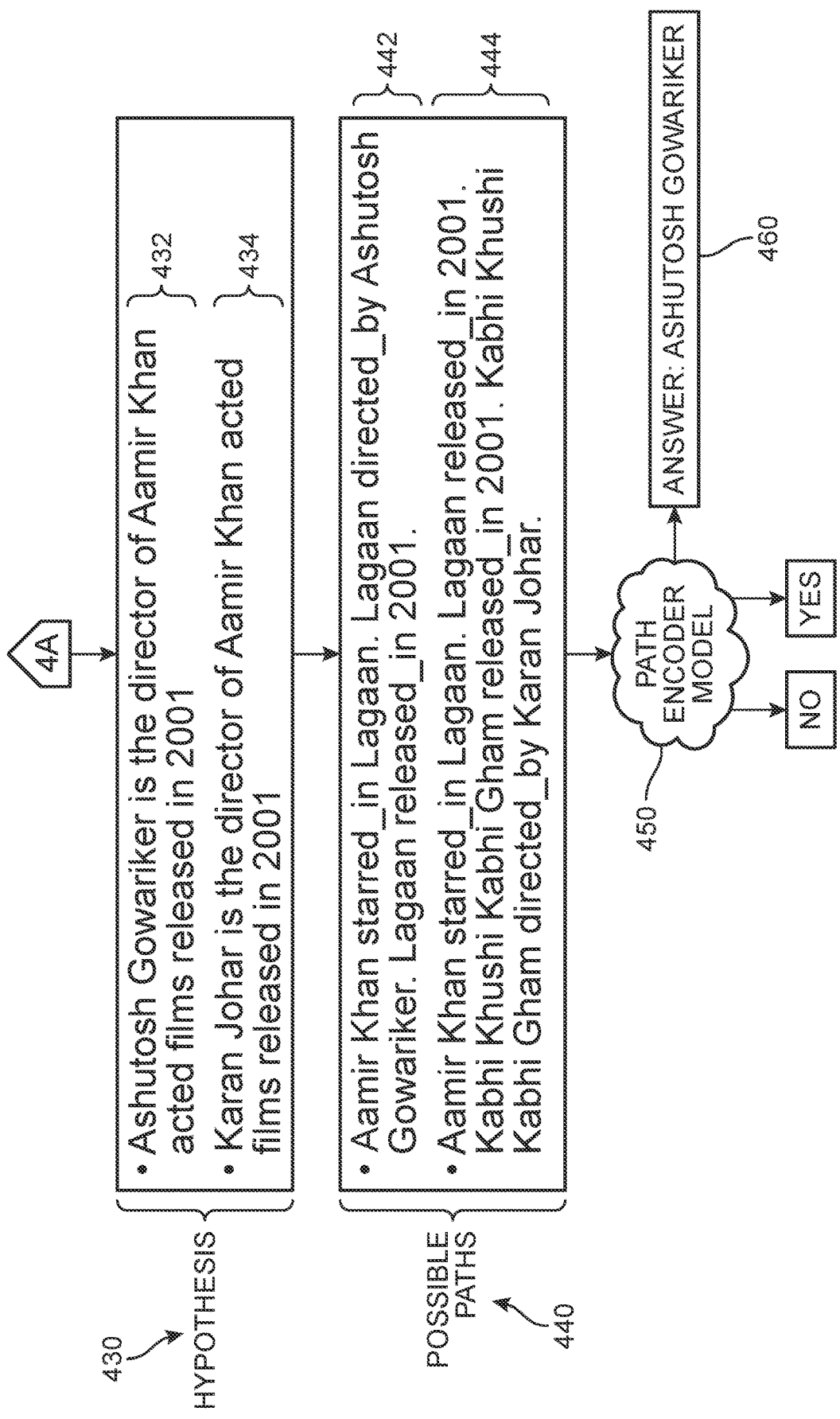

For purposes of clarity, FIGS. 4A and 4B present an illustrated schematic example of an implementation of the proposed system and method. In FIG. 4A, a query 410 "Who is the director of Aamir Khan acted films which released in 2001 ?" is posed. A schematic flow diagram depicts a sample Q-and-A cycle 420 in which the relevant entity relationships are extracted for the query 410 from a KG. In this case, the cycle 420 initially identifies a first data 422 ("Lagaan was released in 2001"), from which a second data 426 ("Aamir Khan starred in Lagaan") and a third data 424 ("Lagaan was directed by Ashutosh Gowariker") are extracted. A question mark 428 represents the missing connecting data element that would verify the answer. Referring now to FIG. 4B, a generated hypothesis 430 and possible paths (premise) 440 are presented. As noted earlier, the premise is a set of sentences and hypothesis is a single sentence. As will be discussed below, after forming the set of paths that form the premise, the proposed HRPE model can be used to generate the inferred answers. In this case, a first hypothesis 432 and

TABLE 1

| Dataset Type | | MetaQA | | | PQ | |
|---|---|---|---|---|---|---|
| Path Length | Model | HRPE | VRN | SRN | HRPE | SRN |
| Two Path Length | Classification Accuracy | 98.4 | — | — | 77.75 | — |
| | QA Accuracy | 95 | 91.9 | 95.1 | 56.54 | — |
| | # Test QA | 10045 | 10045 | 14872 | 191 | 191 |
| Three Path Length | Classification Accuracy | 97.71 | — | — | 94.18 | — |
| | QA Accuracy | 84.77 | 58/59.7 | 75.2 | 88.96 | 89.2 |
| | # Test QA | 4969 | 2665/4969 | 14274 | 335 | 520 |

As shown in TABLE 1 above, the HRPE results were also compared with the SRN model, a neural network-based reinforcement learning based method that solves multi-hop question answering as a sequential decision problem. The HRPE model exceeded the SRN model published for the (MetaQA) Dataset in multi-hop reasoning. In addition, it can be seen that the HRPE model performed approximately as well as the SRN model for both datasets in single-hop reasoning. The accuracy was calculated the via Hit@1 first path 442 are classified as "yes" and a second hypothesis 434 and second path 444 are classified as "no", resulting in a correct answer 460 ("Ashutosh Gowariker").

An example of an implementation of training data for the proposed method is presented in Table 3 below, where a test query is initially posed with the correct answer ("Gary Nelson"). A set of negative samples are generated from the knowledge graph according to the three length path, producing four answers in a multiple choice type approach ("Gary Nelson|Peter Sasdy|William Dieterle|Rodney Gibbons").

TABLE 3

Q: Who are the directors of the movies written by the writer of She?
A: Gary Nelson
Q: Who are the directors of the movies written by the writer of She?
A: Gary Nelson | Peter Sasdy | William Dieterle | Rodney Gibbons

| PATH | HYPOTHESIS | CLASSIFICATION |
|---|---|---|
| She written_by H_Rider_Haggard Allan_Quatermain_and_the_Lost_City_of_Gold written_by H_Rider_Haggard Allan_Quatermain_and_the_Lost_City_of_Gold directed_by Gary_Nelson. | Gary Nelson is the director of the movies written by the writer of She | YES |
| She starred_actors Peter_Cushing The_Hound_of_the_Baskervilles starred_actors Peter_Cushing The_Hound_of_the_Baskervilles directed_by Rodney_Gibbons. She starred_actors Nigel_Bruce The_Hound_of_the_Baskervilles starred_actors Nigel_Bruce The_Hound_of_the_Baskervilles directed_by Rodney_Gibbons. | Rodney Gibbons is the director of the movies written by the writer of She | NO |

The training data information is converted into the previously described premise and hypothesis format. In this case, the premise set are paths between the movie "She" and the answer options, and the hypothesis corresponds to a selected answer. As shown above, the correct answer is classified as YES, and the incorrect answer classified as NO. This example shows how data will be generated by the proposed model.

Figure 5:
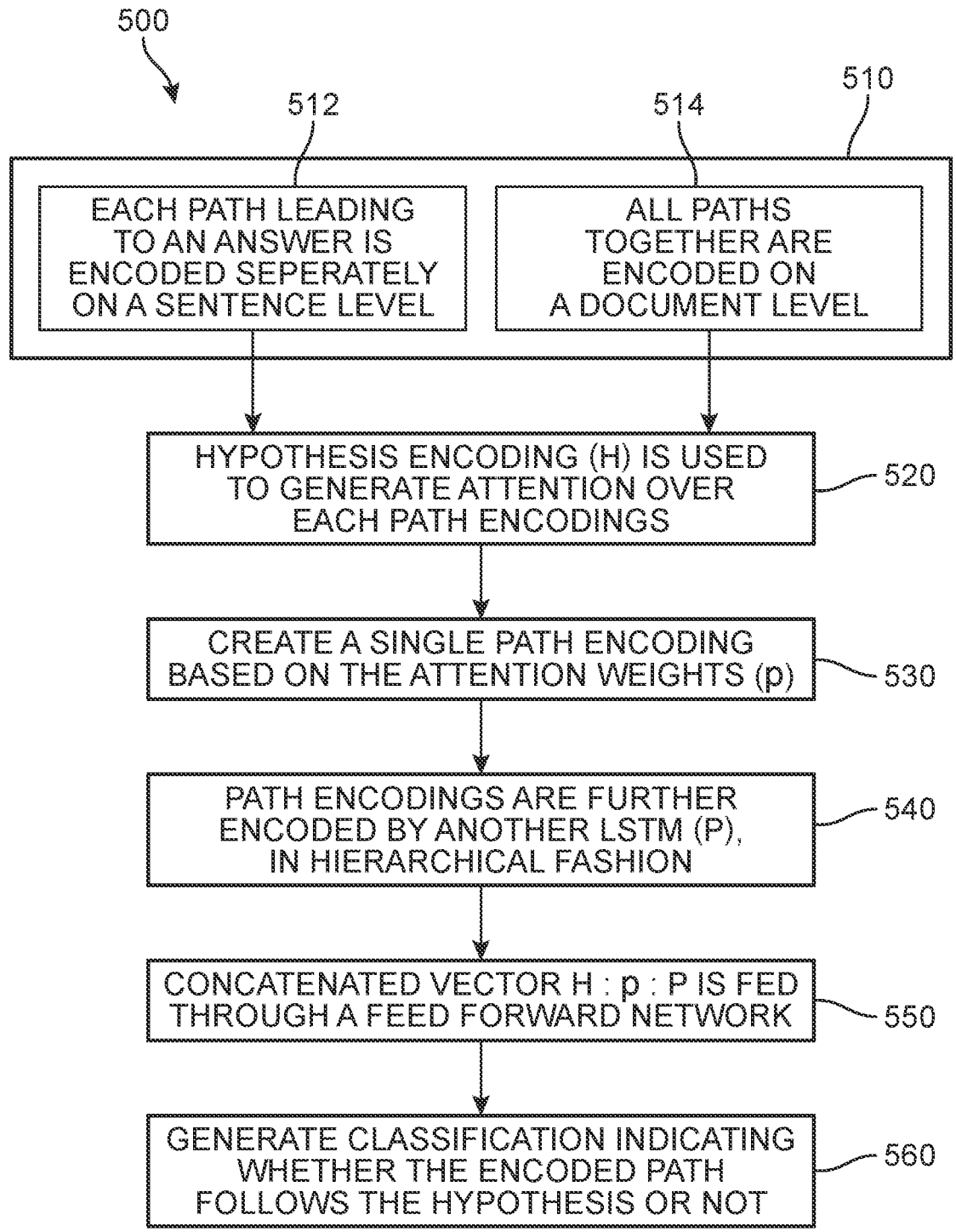
FIG. 5 is a flow diagram describing a process of automatically inferring an answer to a query, according to an embodiment.

Referring now to FIG. 5, a flow diagram 500 representing one embodiment of the proposed methods is presented. A first stage 510 includes two tasks, where a first task 512 involves encoding each path leading to an answer separately on a sentence level, and a second task 514 involves encoding of all of the paths together on a document level. The two encoded sets are used in a second stage 520 where hypothesis encoding is used to generate attention over each path encoding. In a third stage 530, a single path encoding is created based on the attention weights, followed by a fourth stage 540 in which path encodings are further encoded by another LSTM in hierarchical fashion. A fifth stage 550 includes feeding a concatenated vector through a Feed Forward network, and a sixth stage 560 involves generating classification(s) indicating whether the encoded path(s) follow the hypothesis or not.

Figure 6:
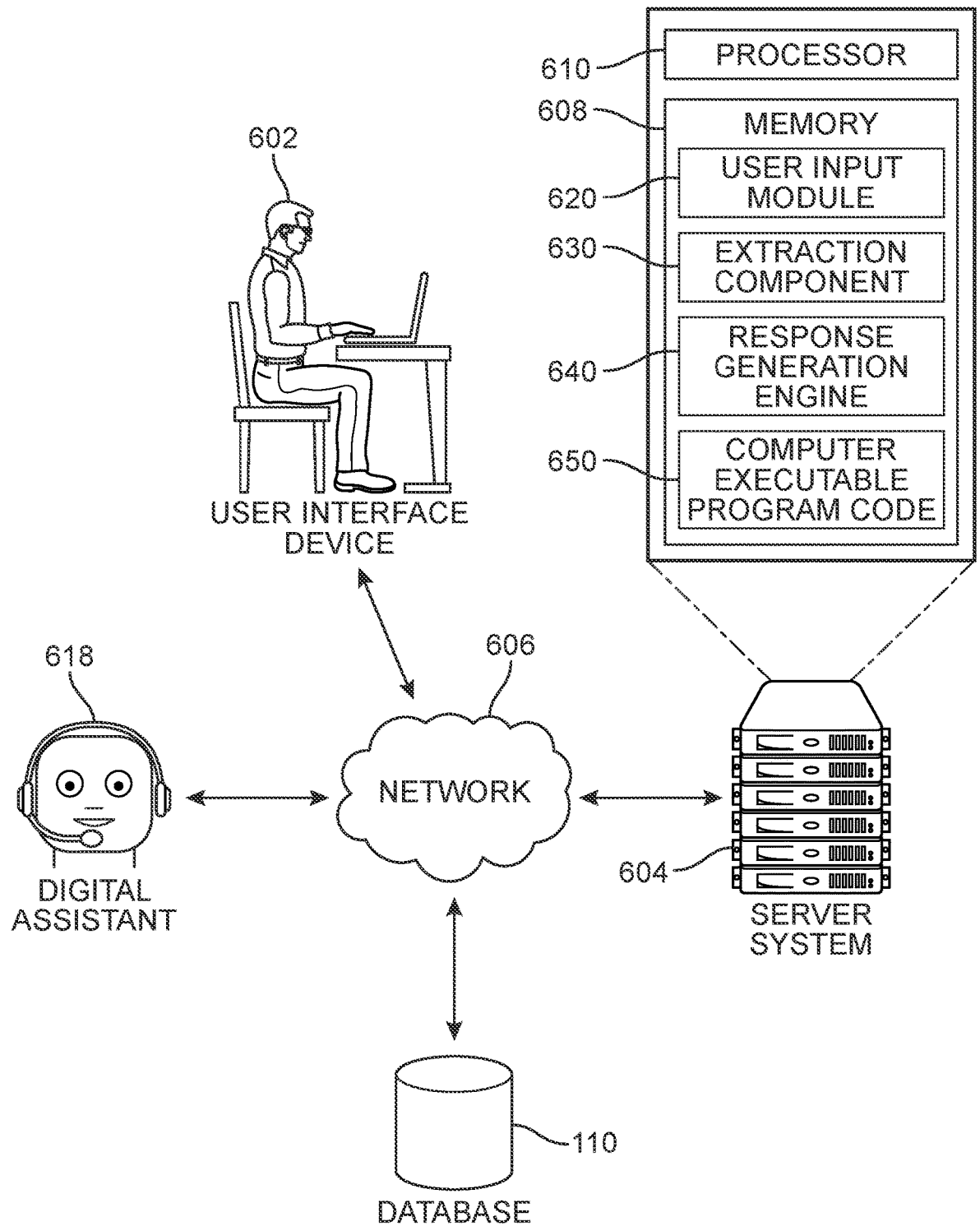
FIG. 6 is a system for executing an inference-based response system, according to an embodiment.

An embodiment of a system 600 for automatically generating responses to user input queries based on the HRPE model is shown in FIG. 6. As depicted in FIG. 6, a user interface computing device ("computing device") 602 associated with a user represents any device executing computer executable program code (e.g., as application programs, operating system functionality, or both) to implement the operations and functionality associated with the computing device 602. The computing device 602 may include a mobile computing device or any other portable device. In some examples, the mobile computing device includes a mobile telephone, laptop, tablet, computing pad, netbook, gaming device, and/or portable media player. The computing device 602 may also include more stationary devices such as desktop personal computers, kiosks, tabletop devices, etc.

In some examples, the computing device 602 includes a communications interface component. The communications interface component includes a network interface card and/or computer-executable instructions (e.g., a driver) for operating the network interface card. Communication between the computing device 602 and other devices may occur using any protocol or mechanism over any wired or wireless connection. In some examples, the communications interface component is operable with short range communication technologies, such as by using near-field communication (NFC) tags. Computing device 602 also includes input devices such as one or of a keyboard, a mouse, a touch screen, a microphone, a camera, a graphical user interface, or any other type of input device. Output device(s) of computing device 602 may include, without limitation, a display screen, a graphical user interface, a speaker, or any other type of output device.

In some embodiments, the computing device 602 may optionally include or otherwise be configured to access a digital assistant 618, for example via network 606. The digital assistant 618 can include a conversational agent or other response generation system capable of communicating with a user using natural language responses to user queries and messages. Furthermore, computing device 602 may optionally connect to a server computing system ("computing system") 604 via network 606. The network 606 may include any type of network connection. In one example, the network 606 may refer to the Internet, an intranet, an Ethernet, or other wireless or hardwired connections by which devices may send and receive data.

In different embodiments, an inference-based response generation module ("inference module") may be hosted in computing system 604, which may have a memory 608 and a processor 610. Processor 610 may include a single device processor located on a single device, or it may include multiple device processors located on one or more physical devices. Memory 608 may include any type of storage, which may be physically located on one physical device, or on multiple physical devices. In some cases, computing system 604 may comprise one or more servers that are used to host the inference module. In addition, the processor 610 is programmed to execute computer executable program code 650 for implementing aspects of the disclosure. The computer executable program code 650 includes instructions that may be performed by the processor 610 within the computing system 604, or performed by a processor external to the computing system 604. In some examples, the processor 610 is programmed to execute instructions such as those illustrated in the figures, such as, FIG. 1, FIG. 2, FIG. 3, and FIG. 5.

Furthermore, memory 608 stores one or more computer-executable components that can comprise the inference module. Some example components include, without limitation, a user input module 620, an extraction component 630, and a response generation engine 640. In some embodiments, memory 608 further stores inference module training components. The response generation engine 640, when executed by the processor 610 of the computing system 604, causes the processor to generate an answer to a query received via user input module 620. In some embodiments, response generation engine 640 generates a response to user generated queries. In some examples, response generation engine 640 includes a machine learning model, as discussed above. The machine learning model may include a neural network model. In some embodiments, the neural network uses a Recurrent Neural Network Language Model (RLM) architecture. In one embodiment, the RLM model architecture and/or the response generation engine architecture can be configured as completely data-driven and can easily be trained end-to-end using unstructured conversational data without requiring human annotation, scripting, or automatic parsing. The memory 608 may optionally store an extraction component 630 for performing the entity extraction and linking techniques described herein as well as conversion and generation of data. The computing system 604 may also optionally store and/or access data stored on remote data storage, also referred to herein as the KG database 110. The KG database 110 may be any type of data storage system, such as, but without limitation, a cloud storage system.

Figure 7:
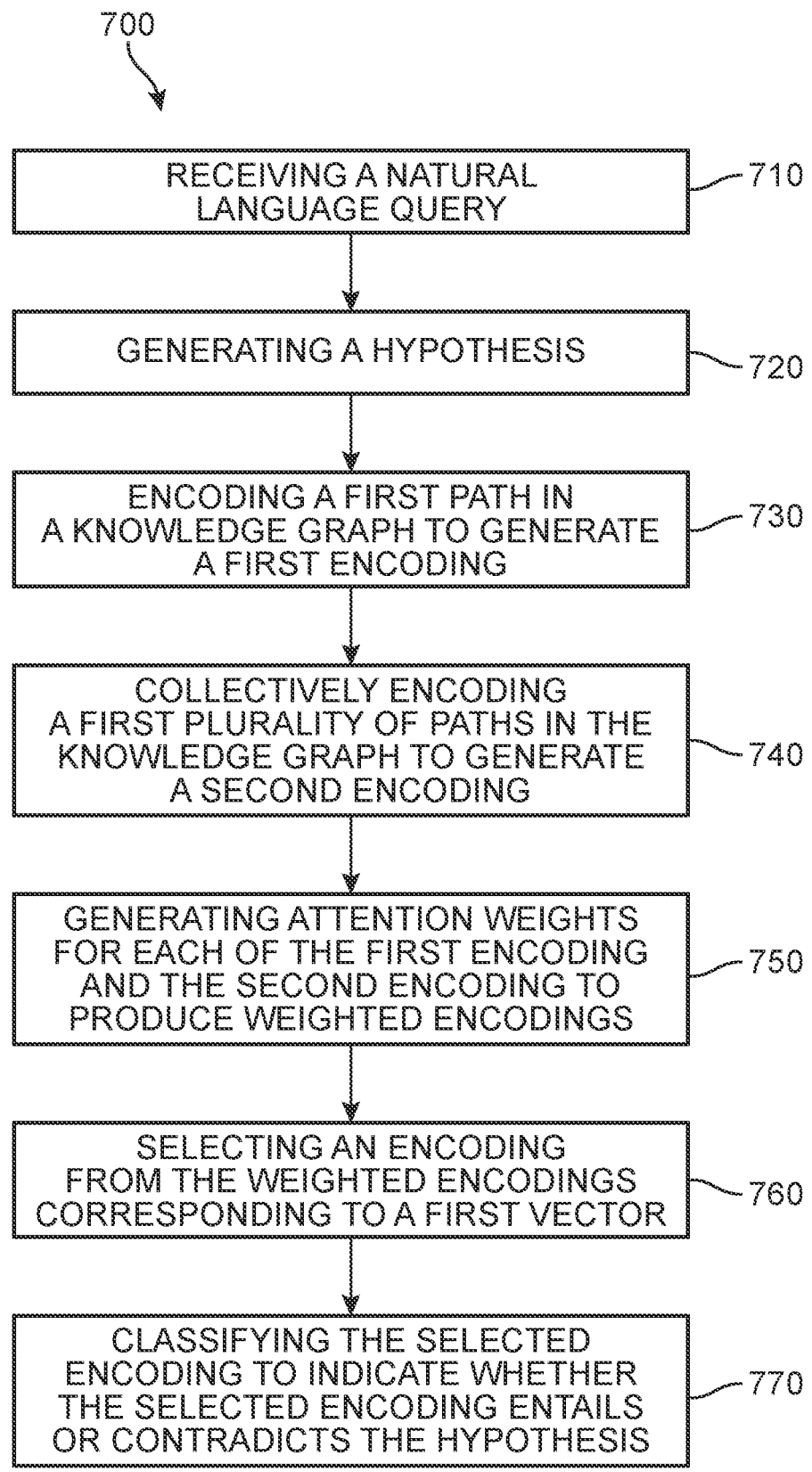
FIG. 7 is a flow chart presenting a method of providing a response to a query, according to an embodiment.

FIG. 7 is a flow chart illustrating an embodiment of a method 700 of generating responses to a query. As shown in FIG. 7, a first step 710 of the method 700 includes receiving a natural language query (e.g., "Which person directed the films acted by the actors in Kid Millions?"), and a second step 710 includes generating a hypothesis (e.g., "David Butler directed the films acted by the actors in Kid Millions") based on the received query. The method 700 also includes a third step 730 of encoding a first path in a knowledge graph to generate a first encoding, where the first path connects to a first possible answer (e.g., "David Butler") to the query. A fourth step 740 includes collectively encoding a first plurality of paths (e.g., "David Butler", "Douglas Sirk", "Tom Hooper", "Franck Khalfoun") in the knowledge graph to generate a second encoding, where the first plurality of paths includes at least the first path. In a fifth step 750, the method 700 includes generating attention weights for each of the first encoding and the second encoding to produce weighted encodings. The method further includes a sixth step 760 of selecting an encoding from the weighted encodings based on which encoding is associated with a greater attention weight (e.g., "David Butler"), where the selected encoding corresponds to a first vector, and a seventh step 770 of classifying the first vector, where the classification indicates whether the selected encoding entails or contradicts the hypothesis.

In other embodiments, the method may include additional steps or aspects. In some embodiments, the method also includes outputting a natural language response to the query, for example for display on a computer screen. In some cases, the query is converted into a hypothesis in part by removing interrogatory-type words from the query. In another example, the method further includes steps of encoding the hypothesis using a bidirectional-long short-term memory neural network (bi-LSTM) to produce a second vector, and using the second vector to generate the attention weights. In such cases, the method can also include encoding the first encoding and the second encoding by a long short-term memory (LSTM) neural network to produce a third vector, and concatenating the first vector with both the second vector and the third vector to produce a concatenated vector. In another example, the method may further include processing the concatenated vector through a Feed Forward network in order to determine whether the selected encoding entails or contradicts the hypothesis. Furthermore, in some embodiments, the method can also include a step of processing an output of the Feed Forward network through a SoftMax classifier in order to perform the classification.

In different embodiments, the disclosed system and method may be part of a natural language understanding system or a spoken language understanding system. Taking advantage of the availability of large annotated data, a deep learning-based inference model has been disclosed. Unlike conventional models that drop in accuracy when subjected to long sequence lengths (above 256-512), the proposed embodiments continue to perform well with longer sequence lengths. In addition, the proposed model takes advantage of the depth of information stored in knowledge graphs.

It should be understood that the proposed embodiments are distinct from other approaches for QA on KG, which typically convert the natural language query into a structured query language, and/or apply a machine translation approach with source language as the natural language and target language as the structured query language. In addition, while some QA over text has been attempted from an inference perspective, in cases where a KG is included, the KG is created from the text. In contrast, the proposed embodiments do not convert the query into intermediate structured form, instead seeking to generate the answer directly from the KG.

It should be understood that the systems and/or methods as described herein may be implemented using different computing systems, components, modules, and connections. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage component, an input component, an output component, and a communication interface.

The bus will include a component that permits communication among the components of the device. The processor is implemented in hardware, firmware, or a combination of hardware and software. The processor is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, a processor includes one or more processors capable of being programmed to perform a function. Memory includes a random access memory (RAM), a read only memory (ROM), and/or another type of dynamic or static storage device (e.g., a flash memory, a magnetic memory, and/or an optical memory) that stores information and/or instructions for use by a processor(s).

In addition, storage components store information and/or software related to the operation and use of the device. For example, storage components may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Thus, the device may perform one or more processes described herein. The device may perform these processes based on processor executing software instructions stored by a non-transitory computer-readable medium, such as memory and/or storage component. A computer-readable medium is defined herein as a non-transitory memory device. A memory device includes memory space within a single physical storage device or memory space spread across multiple physical storage devices.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource").

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the policy management service and/or any other software capable of being provided via cloud computing environment, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program, and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems, and may manage the execution of the guest operating systems. Multiple instances of a variety of operating systems may share virtualized hardware resources.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

This disclosure includes and contemplates combinations with features and elements known to the average artisan in the art. The embodiments, features and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted. Also, various modifications and changes may be made within the scope of the attached claims.

We claim:

1. A computer implemented method of using a Hierarchical Recurrent Path Encoder (HRPE) model to control a virtual agent by generating responses to queries received by the virtual agent, the method comprising:
   receiving a natural language query;
   generating hypothesis based on the received query;
   receiving, at an attention component of the HRPE model, the hypothesis;
   encoding, by the HRPE model, a first path in a knowledge graph to generate a first encoding, the first path connecting to a first possible answer to the query;
   collectively encoding, by the HRPE model, a first plurality of paths in the knowledge graph to generate a second encoding, the first plurality of paths including the first path;
   generating, by the HRPE model, attention weights for each of the first encoding and the second encoding to produce weighted encodings;
   selecting, by the attention component and based on the hypothesis, an encoding from the weighted encodings based on which encoding is associated with a greater attention weight, the selected encoding corresponding to a first vector;
   determining, via a feed forward network layer of the HRPE model, whether the first vector follows the hypothesis or not;
   classifying the first vector based on output of the feed forward network layer, the classification indicating whether the selected encoding entails or contradicts the hypothesis; and
   generating, via an inference-based response generation module associated with the HRPE model, a natural language response to the query based on the classification.

2. The computer implemented method of claim 1, further comprising encoding, by the HRPE model, a second path in the knowledge graph to generate a third encoding, the second path connecting to a second possible answer to the query, wherein the first plurality of paths includes the second path.

3. The computer implemented method of claim 1, wherein the query is converted into a hypothesis in part by removing interrogatory-type words from the query.

4. The computer implemented method of claim 1, further comprising:
   encoding the hypothesis using a bidirectional-long short-term memory neural network (bi-LSTM) to produce a second vector; and
   using the second vector to generate the attention weights.

5. The computer implemented method of claim 4, further comprising:
   encoding the first encoding and the second encoding by a long short-term memory (LSTM) neural network to produce a third vector; and
   concatenating the first vector with both the second vector and the third vector to produce a concatenated vector.

6. The computer implemented method of claim 5, further comprising processing the concatenated vector through the feed forward network layer in order to determine whether the first vector follows the hypothesis or not.

7. The computer implemented method of claim 6, further comprising processing the output of the feed forward network layer through a SoftMax classifier in order to perform the classification.

8. A non-transitory computer-readable medium storing software comprising instructions executable by one or more computers which, upon such execution, cause the one or more computers to use a Hierarchical Recurrent Path Encoder (HRPE) model to control a virtual agent by generating responses to queries received by the virtual agent by performing the following operations:
   receive a natural language query;
   generate hypothesis based on the received query;
   receive, at an attention component of the HRPE model, the hypothesis;
   encode, by the HRPE model, a first path in a knowledge graph to generate a first encoding, the first path connecting to a first possible answer to the query;
   collectively encode, by the HRPE model, a first plurality of paths in the knowledge graph to generate a second encoding, the first plurality of paths including the first path;
   generate, by the HRPE model, attention weights for each of the first encoding and the second encoding to produce weighted encodings;
   select, by the attention component and based on the hypothesis, an encoding from the weighted encodings based on which encoding is associated with a greater attention weight, the selected encoding corresponding to a first vector;

determine, via a feed forward network layer of the HRPE model, whether the first vector follows the hypothesis or not;

classify the first vector based on output of the feed forward network layer, the classification indicating whether the selected encoding entails or contradicts the hypothesis; and generate, via an inference-based response generation module associated with the HRPE model, a natural language response to the query based on the classification.

9. The non-transitory computer-readable medium storing software of claim 8, wherein the instructions further cause the one or more computers to encode, by the HRPE model, a second path in the knowledge graph to generate a third encoding, the second path connecting to a second possible answer to the query, wherein the first plurality of paths includes the second path.

10. The non-transitory computer-readable medium storing software of claim 8, wherein the query is converted into a hypothesis in part by removing interrogatory-type words from the query.

11. The non-transitory computer-readable medium storing software of claim 8, wherein the instructions further cause the one or more computers to:

encode the hypothesis using a bidirectional-long short-term memory neural network (bi-LSTM) to produce a second vector; and use the second vector to generate the attention weights.

12. The non-transitory computer-readable medium storing software of claim 11, wherein the instructions further cause the one or more computers to:

encode the first encoding and the second encoding by a long short-term memory (LSTM) neural network to produce a third vector; and concatenate the first vector with both the second vector and the third vector to produce a concatenated vector.

13. The non-transitory computer-readable medium storing software of claim 12, wherein the instructions further cause the one or more computers to process the concatenated vector through the feed forward network layer in order to determine whether the first vector follows the hypothesis or not.

14. The non-transitory computer-readable medium storing software of claim 13, wherein the instructions further cause the one or more computers to process the output of the feed forward network layer through a SoftMax classifier in order to perform the classification.

15. A system for using a Hierarchical Recurrent Path Encoder (HRPE) model to control a virtual agent by generating responses to queries received by the virtual agent, the system comprising:

one or more computers and one or more storage devices storing instructions that are operable, when executed by the one or more computers, to cause the one or more computers to:

receive a natural language query;
generate hypothesis based on the received query;
receive, at an attention component of the HRPE model, the hypothesis;

encode, by the HRPE model, a first path in a knowledge graph to generate a first encoding, the first path connecting to a first possible answer to the query;

collectively encode, by the HRPE model, a first plurality of paths in the knowledge graph to generate a second encoding, the first plurality of paths including the first path;

generate, by the HRPE model, attention weights for each of the first encoding and the second encoding to produce weighted encodings;

select, by the attention component and based on the hypothesis, an encoding from the weighted encodings based on which encoding is associated with a greater attention weight, the selected encoding corresponding to a first vector;

determine, via a feed forward network layer of the HRPE model, whether the first vector follows the hypothesis or not;

classify the first vector based on output of the feed forward network layer, the classification indicating whether the selected encoding entails or contradicts the hypothesis; and generate, via an inference-based response generation module associated with the HRPE model, a natural language response to the query based on the classification.

16. The system of claim 15, wherein the instructions further cause the one or more computers to encode, by the HRPE model, a second path in the knowledge graph to generate a third encoding, the second path connecting to a second possible answer to the query, wherein the first plurality of paths includes the second path.

17. The system of claim 15, wherein the query is converted into a hypothesis in part by removing interrogatory-type words from the query.

18. The system of claim 15, wherein the instructions further cause the one or more computers to:

encode the hypothesis using a bidirectional-long short-term memory neural network (bi-LSTM) to produce a second vector; and use the second vector to generate the attention weights.

19. The system of claim 18, wherein the instructions further cause the one or more computers to:

encode the first encoding and the second encoding by a long short-term memory (LSTM) neural network to produce a third vector; and concatenate the first vector with both the second vector and the third vector to produce a concatenated vector.

20. The system of claim 19, wherein the instructions further cause the one or more computers to process the concatenated vector through the feed forward network layer in order to determine whether the first vector follows the hypothesis or not.

* * * * *